United States Patent [19]

Rosenberg

[11] Patent Number: 5,089,315
[45] Date of Patent: Feb. 18, 1992

[54] GLASS SLIDE

[75] Inventor: H. James Rosenberg, Wellesley, Mass.

[73] Assignee: Erie Scientific Company, Portsmouth, N.H.

[21] Appl. No.: 416,521

[22] Filed: Oct. 3, 1989

[51] Int. Cl.$^5$ .................. B32B 23/02; G02B 21/34
[52] U.S. Cl. .................. 428/192; 428/210; 356/244; 359/396; 359/397
[58] Field of Search .................. 356/244, 245, 246; 350/534, 535; 428/210, 192, 81, 426, 409

[56] References Cited

U.S. PATENT DOCUMENTS

| | | | |
|---|---|---|---|
| 3,481,659 | 12/1969 | Rosenberg | 350/535 |
| 4,087,154 | 5/1978 | Menzel | 350/534 |
| 4,679,914 | 7/1987 | Rosenberg | 350/534 |

Primary Examiner—Ellis P. Robinson
Assistant Examiner—Donald J. Loney
Attorney, Agent, or Firm—Marjama & Pincelli

[57] ABSTRACT

A glass slide having a top surface and a bottom surface. The slide has at least one marking surface which has a first visual appearance when viewed from the top, and a second visual appearance when viewed from the bottom so as to allow the surface to be easily distinguished.

9 Claims, 1 Drawing Sheet

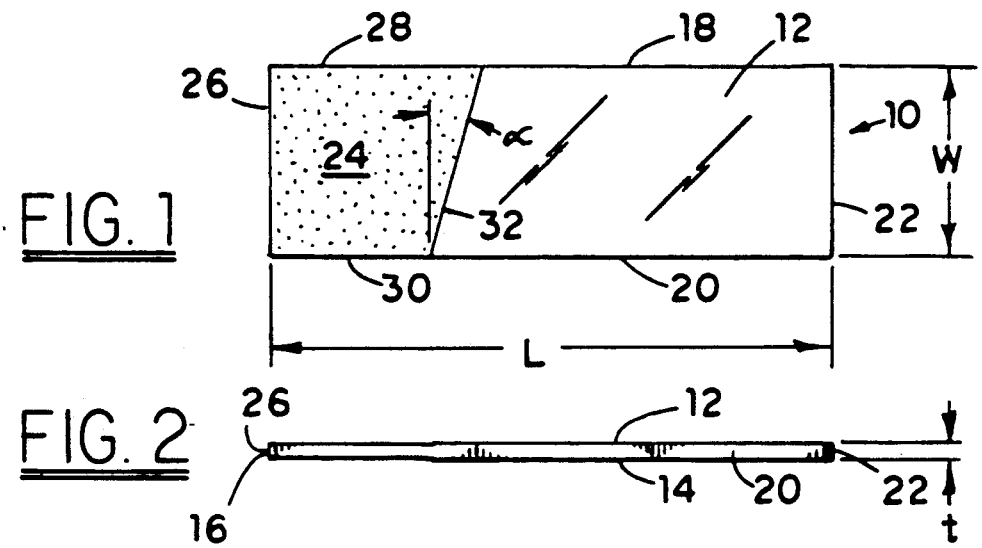
FIG. 1
FIG. 2
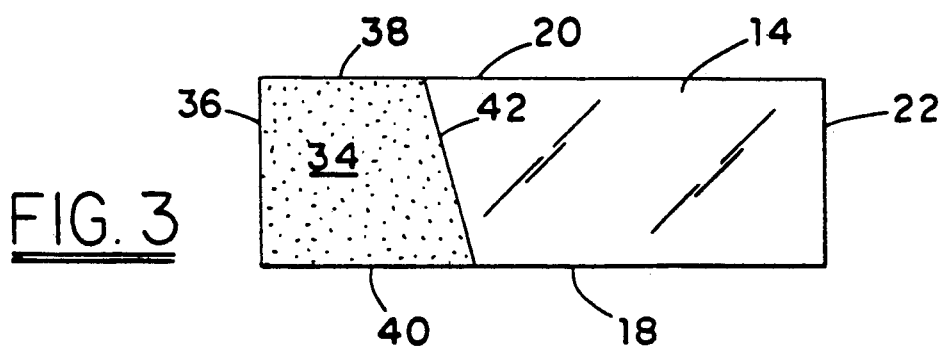
FIG. 3
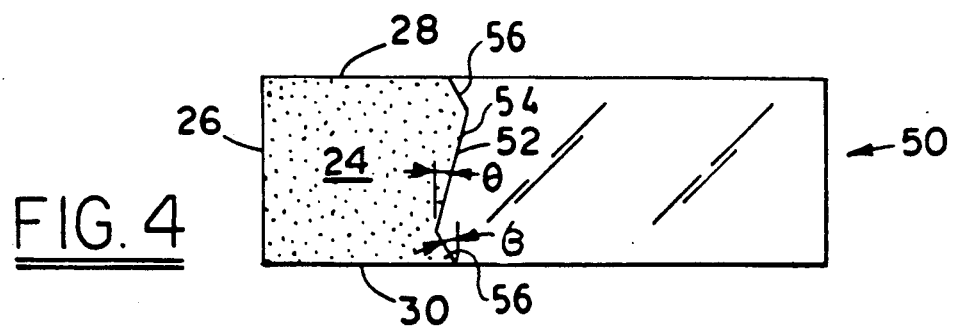
FIG. 4
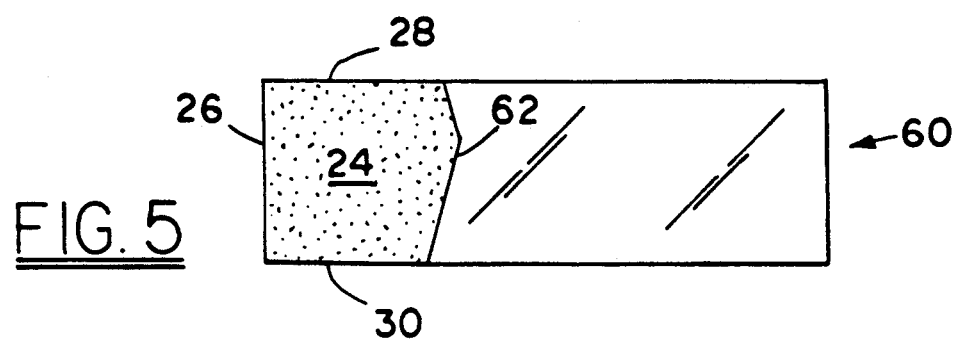
FIG. 5

GLASS SLIDE

BACKGROUND OF THE INVENTION

The present invention relates to glass slides; and more particularly to a microscope glass slide having a marking portion configured to assist in the orientation of the slide.

When a lab technician places a specimen on microscope slide, particularly if that specimen is a clear bodily fluid, it is often difficult to know which side of the slide the specimen has been placed. On slides that have a marking surface located on only one side, or if a word, such as "specimen", is printed thereon, the top side of slide is easily identifiable. However, on slides that are designed to have marking areas located on both sides of the slide, it is extremely difficult to determine which is the top side of the slide on which a specimen has been placed. This is true because the marking surfaces on both sides of the slide have an edge which is parallel with the end edge of the slide, thus making it nearly impossible to distinguish the end of the marking surface on one side vs. that on the other side.

Applicants have invented a glass slide wherein the top surface of the slide on which a specimen has been placed can be readily identified by the configuration on the marking surface regardless whether a single or double frosted area has been placed on the slide.

SUMMARY OF THE INVENTION

A glass slide having a top surface and a bottom surface. The slide has at least one marking surface which has a first visual appearance when viewed from the top, and a second visual appearance when viewed from the bottom so as to allow the surface to be easily distinguished.

DETAILED DESCRIPTION OF THE DRAWINGS

FIG. 1 is top plan view of a microscope slide made in accordance with the present invention;

FIG. 2 is a front elevational view of the slide shown in FIG. 1;

FIG. 3 is a bottom plan view of the microscope slide shown in FIG. 1;

FIG. 4 is a top plan view of a modified microscope slide also made in accordance with the present invention; and FIG. 5 is a top plan view of yet another modified microscope slide made in accordance with the present invention.

DETAILED DESCRIPTION

Referring to FIGS. 1, 2 and 3, a rectangular glass microscope slide is illustrated having in length L, a width W, and a thickness T. In the particular embodiment illustrated, the length L is approximately 75 mm, the width W is about 25 mm and the thickness T is about 1 mm. However, it is to be understood that length L, width W and thickness T may be of any size so desired. The slide 10 has a top surface 12, a bottom surface 14, a left edge 16, a right edge 18, a top edge 20 and bottom edge 22. On the left hand portion of top surface 12 there is provided a marking surface 24 having a left edge 26, top edge 28, bottom edge 30 and right edge 32. The marking portion 24 may be made in any conventional manner, for example, by acid etching, grinding, sand blasting, or by the placement of a printed surface as discussed in U.S. Pat. Nos. 4,481,246 and 4,624,882. In the particular embodiment illustrated, marking surface 24 is formed by a grinding operation. The left edge 26 of marking surface 24, is adjacent and parallel to the left edge 16 of slide 10, the top edge 28 of marking surface 24 is parallel and adjacent the top edge 18 of slide 10, and the bottom edge 30 of marking surface 24 is adjacent and parallel to the bottom edge 20 of slide 10. The right edge 32 of the marking surface is disposed at an angle $\alpha$ with respect to a line which is parallel to the left edge 26. The angle $\alpha$ is selected such that a noticeable orientation can be viewed with regard to the right edge 32 so as to provide easy identification of the top surface 12. In the present instance, the right edge 32 is inclined to the right at an angle in the range of about 5°–10°. In this manner, the top surface can be readily identified by this orientation as top edge 28 is noticeably longer than bottom edge 30. In the particular embodiment illustrated, marking surface 24 has a substantially trapezoidal shape.

In the particular embodiment illustrated, the bottom surface 14 is provided with a second marking surface 34 which is substantially identical in shape and configuration to marking surface 24. The second marking surface 34 has a left edge 36, top edge 28, bottom edge 40 and right edge 42 which corresponds in position with edges 26, 28, 30 and 32, respectively, of marking surface 24. Thus, the marking surface 36 is exactly behind marking surface 24. Thus in this situation, in viewing the bottom surface, the right edge 42 will be angled in the opposite sense that right edge 32 is located. Since there is a distinct difference in inclination, i.e. to the left for edge 42 as opposed to the right for edge 32, the user of the slide can readily determine which is the top or bottom surface. In the particular embodiment illustrated, the slanting of edge 42 to the left clearly identifies the bottom surface as seen in FIG. 3, whereas when the edge 32 is slanted to the right, the top surface 24 will be viewed as illustrated in FIG. 1. Thus, a slide 10 having a marking surface on both the top and bottom surfaces can be readily identified as to which is the top surface without providing any additional indicia or other markings thereon.

It is to be understood that various changes and modifications may be made without departing from the spirit or scope of the present invention. For example, FIGS. 4 and 5 illustrate two modified embodiments made in accordance with the present invention.

Referring to FIG. 4, there is illustrated a microscope slide 50, having parts substantially identical to slide 10 illustrated in FIGS. 1–3, identical numbers indicating like parts. The slide 50 includes a first marking surface 24 having a left 26, top edge 28 and bottom edge 30. However, in this embodiment, the right edge 52 of marking surface 24 has a configuration substantially that of a elongated or stretched Z, wherein the central leg 54 is disposed at an angle $\theta$ in the range of about 5°–10° and short segment 56 are inclined at opposite inclination with respect to segment 54 at an angle $\beta$. In the particular embodiment illustrated, angle $\beta$ is approximately equal to angle $\theta$. However, the length, inclination and size of the segments may be varied as desired. Here again, the edge 52 provides quick orientation of the slide so that the top surface 12 can be readily identified. Likewise, the bottom surface of slide 50 may have a second identical marking surface having a substantially identical shape to that top surface. When the bottom surface is turned over, the central length will be viewed from the opposite side so the bottom surface 14 can be readily identified.

Referring to FIG. 5, there is illustrated another modified microscope slide made in accordance with the present invention, identical numbers refer to identical parts as discussed with respect to FIGS. 1-3. The slide 60 is substantially identical to slide 10 except the right edge 62 of marking surface 24 is provided in another distinctive configuration which would clearly identify the top surface. Likewise, the bottom surface having a second identical marking surface 34 identical to and directly behind marking surface 24. Obviously, when the slide is turned over, the right edge 62 has an opposite inclination, thus readily discerning which is the top and bottom surface. As can be seen from the embodiments illustrated, a variety of different configurations may be used for the right edge of the marking surfaces. Certain configurations being easier to manufacture and more easily to readily discern. However, the main distinguishing feature is that when the slide is viewed from the top surface, the right edge has a particular orientation, and when viewed from the bottom surface, has a readily identified means for discerning which is the top surface and bottom surface. This, in the preferred embodiment, is provided by marking surfaces with an asymmetric configuration.

In the preferred embodiment, marking surfaces are provided on both sides of the slide, however, even when only one marking surface is provided, one can readily determine the top surface of the slide as the asymmetric configuration of the marking surface has a distinct configuration when viewed from the top and a second distinct appearance when viewed from the bottom, thus allowing immediate identification. Additionally, as shown in the preferred embodiment, both marking surfaces are identical in configuration, however, they need not be identical so long as one marking surface has a first configuration distinctive appearance when viewed from the top, and the second marking surface can be a second distinct configuration. For example, the bottom surface could have an rectangular marking surface which falls within the perimeter of the first marking surface or the top and bottom marking surfaces could have distinct color identification for each side.

It is to be understood that various modifications and changes may be made to the present invention without departing from the scope of the present invention, the present application being limited by the following claims.

What is claimed is:

1. A glass slide having a top surface, a bottom surface, a left edge, a top edge, a right edge and a bottom edge, said slide having a marking surface located at one end of said top surface, said marking surface having a substantially trapezoidal configuration such that when viewed from the top surface provides a first visual appearance and when viewed from the bottom surface provides a different visual appearance such that the top surface and bottom surface of the slide can be readily determined.

2. A glass slide according to claim 1 wherein three sides of said marking surface are adjacent respective edges of said slide.

3. A glass slide according to claim 1 wherein said marking surface having a right side which is disposed at an angle in the range of about 5°-10° with respect to a line parallel to said left edge of said slide.

4. A glass slide according to claim 1 wherein a second marking surface is provided on said bottom surface substantially behind said first marking surface.

5. A glass slide according to claim 4 wherein said second surface has an outer peripheral configuration identical to said first marking surface and is located directly behind said first marking surface.

6. A glass slide according to claim 1 wherein said slide is a microscope slide.

7. A glass slide having a top surface, a bottom surface, a left edge, a top edge, a right edge and a bottom edge, said slide having a marking surface located at one end of said top surface, said marking surface having a configuration which has three sides that are substantially parallel with three of said edges of said glass slide, said marking surface having a right side having a non-linear asymmetrical configuration such that when viewed from the top surface provides a first visual appearance and when viewed from the bottom surface provides a different visual appearance so that the top surface and the bottom surface of the slide can be readily determined.

8. A glass slide according to claim 7 wherein said right side of said marking surface has a substantially zig-zag configuration.

9. A glass slide having a top surface, a bottom surface, a left edge, a top edge, a right edge, and a bottom edge, said slide having a marking surface located at one end of said top surface, said marking surface having an outer peripheral configuration which is substantially asymmetrical such that when viewed from the top surface provides a first visual appearance and when viewed from the bottom surface provides a different visual appearance such that the top surface and the bottom surface of the slide can be readily determined.

* * * * *